US008345631B2

(12) United States Patent
Kinoshita

(10) Patent No.: US 8,345,631 B2
(45) Date of Patent: Jan. 1, 2013

(54) MOBILE COMMUNICATION SYSTEM, WIRELESS BASE STATION, AND TRANSMISSION RATE ALLOCATION METHOD

(75) Inventor: Yousuke Kinoshita, Tokyo (JP)

(73) Assignee: NEC Corporation, Tokyo (JP)

( * ) Notice: Subject to any disclaimer, the term of this patent is extended or adjusted under 35 U.S.C. 154(b) by 624 days.

(21) Appl. No.: 12/551,911

(22) Filed: Sep. 1, 2009

(65) Prior Publication Data

US 2010/0080191 A1 Apr. 1, 2010

(30) Foreign Application Priority Data

Oct. 1, 2008 (JP) ................................. 2008-256411

(51) Int. Cl.
*H04W 4/00* (2009.01)
*H04B 7/185* (2006.01)
*H01Q 11/12* (2006.01)
*H04B 7/00* (2006.01)
*H04M 1/00* (2006.01)

(52) U.S. Cl. .... 370/331; 370/338; 455/13.4; 455/127.1; 455/522; 455/571

(58) Field of Classification Search .................. 370/331, 370/338; 455/13.4, 522, 571, 127.1
See application file for complete search history.

(56) References Cited

U.S. PATENT DOCUMENTS

| 2004/0192208 | A1* | 9/2004 | Kong et al. | ................. | 455/63.1 |
| 2005/0047393 | A1* | 3/2005 | Liu | ................. | 370/352 |
| 2010/0075654 | A1* | 3/2010 | Cheng | ................. | 455/419 |

FOREIGN PATENT DOCUMENTS

| EP | 1853009 A | 11/2007 |
| JP | 2001136123 A | 5/2001 |
| JP | 2002535872 A | 10/2002 |
| JP | 2007267070 A | 10/2007 |

OTHER PUBLICATIONS

European Search Report for EP 09 01 2479 dated Feb. 19, 2010.
Huawei, "HSPA silent mode for continuous connectivity", 3GPP TSG-RAN WG1 Meeting #43bis, Tdoc R1-051452, Seoul, Korea, Nov. 7-11, 2005.
3GPP TR 25.903 V1.3.0, 3rd Generation Partnership Project, Technical Specification Group Radio Access Network, Continuous Connectivity for Packet Data Users, Release 7, Feb. 2007.
3GPP TS 25.309 V.6.6.0, Technical Specification Group Radio Access Network, FDD Enhanced Uplink, Overall description, Stage 2 (Release 6), Mar. 2006.

* cited by examiner

*Primary Examiner* — Brandon Renner

(57) ABSTRACT

In the present invention, a base station comprises: an RTWP measurement unit that measures RTWP of the base station; a monitoring unit that monitors the start and the removal of the Gating state by each of a plurality of mobile stations; a threshold setting unit that lowers a threshold by the amount of an offset, which is equivalent to the difference in the transmission rate of the mobile station that is decreased as the mobile station starts the Gating operation, if any of the plurality of mobile stations starts the Gating operation; and a scheduling unit that allocates a transmission rate, which is equivalent to the difference between the RTWP of the base station and the threshold, to a mobile station other than the mobile station in the Gating state among the plurality of mobile stations if the RTWP of the base station is less than the threshold.

9 Claims, 9 Drawing Sheets mobile station #1 in HSUPA communication
mobile station #2 in HSUPA communication mobile station #1 in Gating state (initial)
mobile station #2 in HSUPA communication mobile station #1 in Gating state
mobile station #2 in HSUPA communication mobile station #1 in HSUPA communication
mobile station #2 in HSUPA communication mobile station #1 in Gating state (initial)
mobile station #2 in HSUPA communication mobile station #1 in Gating state
mobile station #2 in HSUPA communication

MOBILE COMMUNICATION SYSTEM, WIRELESS BASE STATION, AND TRANSMISSION RATE ALLOCATION METHOD

This application is based upon and claims the benefit of priority from Japanese patent application No. 2008-256411, filed on Oct. 1, 2008, the disclosure of which is incorporated herein in its entirety by reference.

BACKGROUND OF THE INVENTION

1. Field of the Invention

The present invention relates to a mobile communication system, a wireless base station, and a transmission rate allocation method, and particularly, to a transmission rate allocation method for allocating a transmission rate to a mobile station when the mobile station removes Uplink DPCCH (Dedicated Physical Control Channel) Gating to restart an HSUPA (High Speed Uplink Packet Access) communication in HSPA (High Speed Packet Access) evolution in a mobile communication system.

2. Description of the Related Art

In recent years, HSPA evolution has been examined in W-CDMA (Wideband-Code Division Multiple Access) as a way to speed up uplink packet communications or improve Latency.

A technique called Uplink DPCCH Gating is examined in the HSPA evolution.

The Uplink DPCCH Gating is a technique for terminating a transmission operation in an HSPA-related physical channel (UL DPCCH, UL=Uplink) and for using the physical channel only for data transmission in order to prevent uplink interference if no more data is to be transmitted to a wireless base station when a mobile station communicates with the wireless base station through the physical channel.

A practical use of the HSUPA is also examined (for example, 3GPP TS25.309) to improve the uplink coverage and throughput and to reduce the delay.

As in HSDPA (High Speed Downlink Packet Access), a technique, such as adaptive encoding and Hybrid ARQ (Automatic Repeat Request), is implemented in the HSUPA, and TTI (Transmit Time Interval) is 10 mTTI and 2 msTTI.

In the HSUPA, a wireless base station includes a MAC-e scheduler, and the MAC-e scheduler schedules an allowable transmission rate of a mobile station to make RTWP (Received Total Wide Band Power) below a predetermined level.

Other than the RTWP, the MAC-e scheduler schedules the allowable transmission rate of the mobile station based on the transmission rate of the mobile station (reception rate for the wireless base station), SI (Scheduling Information), the usage status in a wired zone, etc. The algorithm is not particularly defined.

An example of the operation of the MAC-e scheduler of the wireless base station will be described with reference to FIG. 1.

The wireless base station measures the RTWP at a certain cycle (step S11) and uses the measurement result for scheduling in the MAC-e scheduler.

The MAC-e scheduler of the wireless base station compares the RTWP measured in step S11 with an RTWP threshold (step S12).

If RTWP<RTWP threshold as a result of the comparison in step S12, the process moves to step S13. In this case, there is still an excess in electric power since the RTWP does not reach the RTWP threshold. Therefore, the transmission rate of one of the mobile stations can be increased. Thus, in step S13, the MAC-e scheduler selects a mobile station in which an increase in the transmission rate will be allowed. Although various algorithms can be considered, it is assumed here that the algorithm is for preferentially selecting a mobile station with a low transmission rate (reception rate in the wireless base station). The MAC-e scheduler then increases the allowable transmission rate of the mobile station selected in step S13 (step S14). However, even if RTWP<RTWP threshold, the allowable transmission rate is not increased in step S14 if the RTWP after the increase in the allowable transmission rate exceeds the RTWP threshold. Thus, it is appropriate that the MAC-e scheduler increases the allowable transmission rate based on a notification through E-AGCH (E-DCH Access Grant Channel, E-DCH=Enhanced-Dedicated Channel) only if the MAC-e scheduler determines that the allowable transmission rate can be increased.

On the other hand, if RTWP≧RTWP threshold as a result of the comparison in step S12, the process ends. In this case, the transmission in high electric power (high rate) cannot be allowed for the mobile station any more, because the RTWP is equal to or greater than the RTWP threshold. Under the condition (RTWP≧RTWP threshold), it is appropriate that the MAC-e scheduler decreases the allowable transmission rate of one of the mobile stations through the E-AGCH depending on the algorithm.

A system configuration and an operation, in which the wireless base station includes the MAC-e scheduler in the mobile communication system, will be described.

The system configuration will be described first with reference to FIGS. 2 and 3.

In FIG. 2, mobile station (#1) 10-1 and mobile station (#2) 10-2 are under the control of wireless base station 20 and are located in the same cell of wireless base station 20. Wireless base station 20 and mobile station (#1) 10-1 are in a state of HSUPA communication (hereinafter, "HSUPA communication state") through a physical channel. Similarly, wireless base station 20 and mobile station (#2) 10-2 are in the HSUPA communication state. The same MAC-e schedulers included in wireless base station 20 schedule the allowable transmission rates of mobile station (#1) 10-1 and mobile station (#2) 10-2.

It is assumed that the state has changed from the state of FIG. 2 to the state of FIG. 3. In FIG. 3, since no more data is to be transmitted to wireless base station 20 in mobile station (#1) 10-1, wireless base station 20 and mobile station (#1) 10-1 are in an Uplink DPCCH Gating state (hereinafter "Gating state") to prevent the uplink interference. Meanwhile, wireless base station 20 and mobile station (#2) 10-2 continue to be in the HSUPA communication state.

An operation, in which the mobile station removes the Gating state and restarts the HSUPA communication, will be described with reference to FIGS. 4 and 5. The system configuration corresponds to the configurations in FIGS. 2 and 3.

As shown in FIG. 2, it is assumed that mobile station (#1) 10-1 and mobile station (#2) 10-2 are under the control of wireless base station 20 and are in the HSUPA communication state. The relationship between the RTWP measured by wireless base station 20 and the RTWP threshold at this point is as shown in FIG. 5A. Other than the electric power of received signals from mobile station (#1) 10-1 and mobile station (#2) 10-2, the RTWP of wireless base station 20 includes electric power caused by interference from other cells and thermal noise. To avoid the RTWP from exceeding the limit value of noise rise, which is an increased amount of noise, the RTWP threshold is set below the limit value of the noise rise.

It is assumed that there is no more data for mobile station (#1) 10-1 to transmit to wireless base station 20 and that, as shown in FIG. 3, the Gating operation for terminating the transmission operation through the physical channel is started to prevent the uplink interference (step A1). Consequently, since mobile station (#1) 10-1 terminates the uplink data transmission, the transmission rate of mobile station (#1) 10-1 (reception rate of wireless base station 20) decreases (step A2). An average value, not an instantaneous value, is used for the transmission (reception) rate in many cases.

Since the transmission rate of mobile station (#1) 10-1 (reception rate of wireless base station 20) decreases, the MAC-e scheduler of wireless base station 20 decreases the allowable transmission rate of mobile station (#1) 10-1 through the E-AGCH (step A3).

As the transmission rate of mobile station (#1) 10-1 (reception rate of wireless base station 20) decreases the RTWP of wireless base station 20 decreases, and the difference between the RTWP and the RTWP threshold increases (step A4). The relationship between the RTWP and the RTWP threshold of wireless base station 20 at this point is as shown in FIG. 5B, and there is a vacancy by the amount of the transmission rate allowed for mobile station (#1) 10-1.

Therefore, the MAC-e scheduler of wireless base station 20 notifies, through the E-AGCH, the increase in the allowable transmission rate to a mobile station having the lowest reception (transmission) rate among the mobile stations other than mobile station (#1) 10-1 under the control [mobile station (#2) 10-2 in this case because the target mobile station is only mobile station (#2) 10-2, step A5]. In response, mobile station (#2) 10-2 increases the transmission rate (step A6).

In wireless base station 20, the reception rate of mobile station (#2) 10-2 increases due to the increase in the transmission rate of mobile station (#2) 10-2 (step A7). The RTWP also increases, and the difference between the RTWP and the RTWP threshold decreases (step A8). As a result, the transmission rate equivalent to the difference between the RTWP, which is generated by the start of the Gating operation by mobile station (#1) 10-1, and the RTWP threshold is allocated to mobile station (#2) 10-2. The relationship between the RTWP of wireless base station 20 and the RTWP threshold at this point is as shown in FIG. 5C.

It is assumed here that mobile station (#1) 10-1 has removed the Gating state to restart HSUPA communication (step A9).

However, the transmission rate of mobile station (#1) 10-1 at this point is still decreased because the allowable transmission rate is decreased in step A3. Therefore, mobile station (#1) 10-1 cannot perform the HSUPA communication at the transmission rate before the Gating operation has been started.

Even if the MAC-e scheduler of wireless base station 20 attempts to increase the transmission rate of mobile station (#1) 10-1, there is no difference between the RTWP and the RTWP threshold because the allowable transmission rate of mobile station (#2) 10-2 is increased in step A5. Therefore, the MAC-e scheduler of wireless base station 20 cannot instinct mobile station (#1) 10-1 to increase the allowable transmission rate.

As described, in the conventional mobile communication system, if a mobile station starts a Gating operation, the transmission rate allowed for the mobile station is allocated to another mobile station. Therefore, there is a problem in which the transmission rate before the Gating operation is started cannot be quickly restored when the mobile station in the Gating state restarts the HSUPA communication.

SUMMARY OF THE INVENTION

Thus, an object of the present invention is to provide a mobile communication system, a wireless base station, and a transmission rate allocation method for solving the above described problem.

The present invention provides a mobile communication system comprising: a base station; and a plurality of mobile stations that are under the control of the base station and that start a Gating operation for terminating a transmission operation through a physical channel if there is no more data to be transmitted to the base station during HSUPA communication with the base station through the physical channel, the base station allocating a transmission rate to each of the plurality of mobile stations, the base station comprising:
an RTWP measurement unit that measures RTWP of the base station;
a monitoring unit that monitors the start and the removal of the Gating state by each of the plurality of mobile stations;
a threshold setting unit that lowers a threshold by the amount of an offset, which is equivalent to a difference in the transmission rate of the mobile station that is decreased as the mobile station starts a Gating operation, if any of the plurality of mobile stations starts the Gating operation; and
a scheduling unit that allocates a transmission rate, which is equivalent to the difference between the RTWP of the base station and the threshold, to a mobile station other than the mobile station in the Gating state among the plurality of mobile stations if the RTWP of the base station is less than the threshold.

The present invention provides a base station that allocates a transmission rate to each of a plurality of mobile stations that are under the control and that start a Gating operation for terminating a transmission operation through a physical channel if no more data is to be transmitted during HSUPA communication through the physical channel, the base station comprising:
an RTWP measurement unit that measures RTWP of the base station;
a monitoring unit that monitors the start and the removal of the Gating state by each of the plurality of mobile stations;
a threshold setting unit that lowers a threshold by the amount of an offset, which is equivalent to a difference in the transmission rate of the mobile station that is decreased as the mobile station starts a Gating operation, if any of the plurality of mobile stations starts the Gating operation; and
a scheduling unit that allocates a transmission rate, which is equivalent to the difference between the RTWP of the base station and the threshold, to a mobile station other than the mobile station in the Gating state among the plurality of mobile stations if the RTWP of the base station is less than the threshold.

The present invention provides a transmission rate allocation method for a base station to allocate a transmission rate to each of a plurality of mobile stations that are under the control and that start a Gating operation for terminating a transmission operation through a physical channel if no more data is to be transmitted during HSUPA communication through the physical channel, the transmission rate allocation method comprising:
measuring RTWP of the base station;
monitoring the start and the removal of the Gating state by each of the plurality of mobile stations;

setting a threshold to lower the threshold by the amount of the offset, which is equivalent to a difference in the transmission rate of the mobile station that is decreased as the mobile station starts the Gating operation, if any of the plurality of mobile stations starts the Gating operation; and scheduling to allocate a transmission rate, which is equivalent to a difference between the RTWP of the base station and the threshold, to a mobile station other than the mobile station in the Gating state among the plurality of mobile stations if the RTWP of the base station is less than the threshold.

According to the present invention, when any of a plurality of mobile stations starts Gating operation, a base station decreases a threshold by the amount of an offset that is equivalent to the decrease in the transmission rate generated by the start of the Gating operation by the mobile station. The base station allocates the transmission rate to each of the plurality of mobile stations based on the comparison result of the difference between the threshold and the RTWP of the base station.

Therefore, the allocation of the transmission rate to other mobile stations can be prevented, and this transmission rate is equivalent to the decrease in the transmission rate generated by the start of the Gating operation by the mobile station. As a result, the electric power for the mobile station to remove the Gating state and restart the HSUPA communication can be secured, and the transmission rate before the Gating operation is started can be quickly restored.

The above and other objects, features, and advantages of the present invention will become apparent from the following description with reference to the accompanying drawings which illustrate examples of the present invention.

DESCRIPTION OF THE PREFERRED EMBODIMENTS

An exemplary embodiment will now be described with reference to the drawings.

Figure 1:
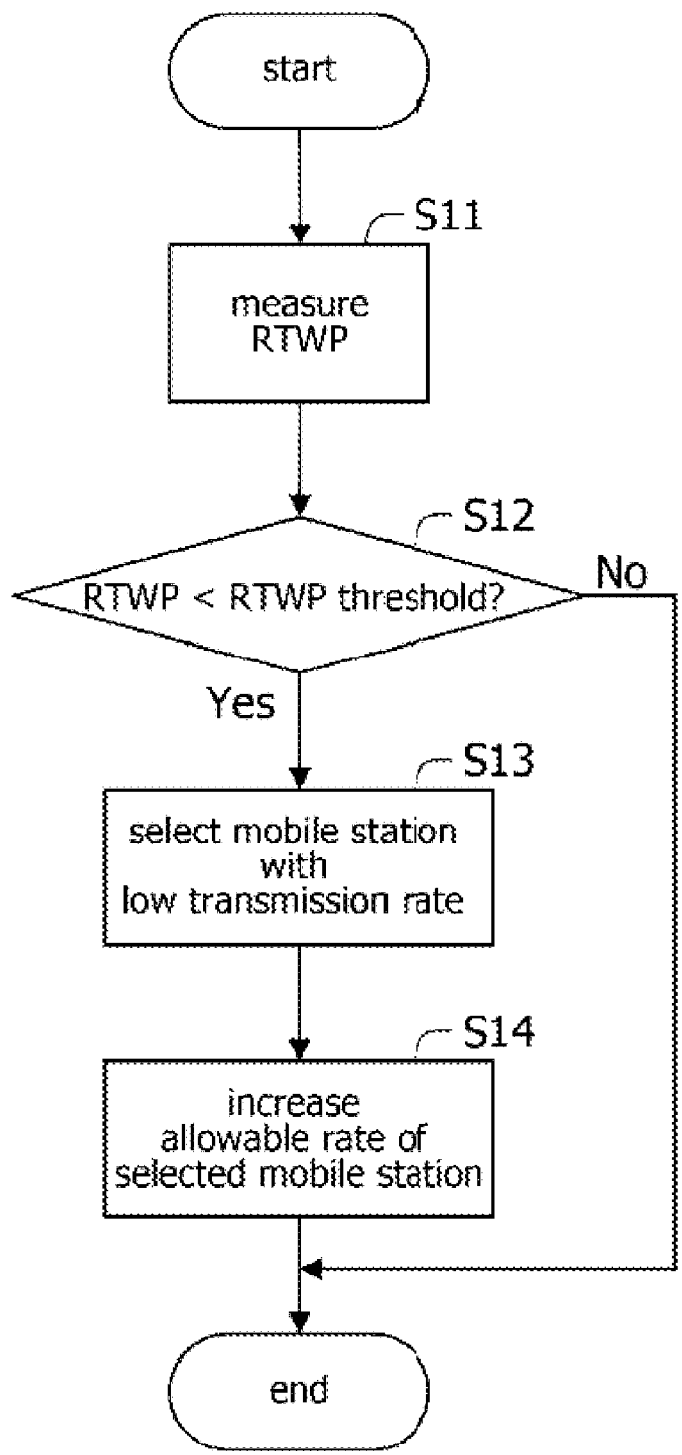
FIG. 1 is a flow chart for explaining an example of the operation of a conventional MAC-e scheduler.
Figure 2:
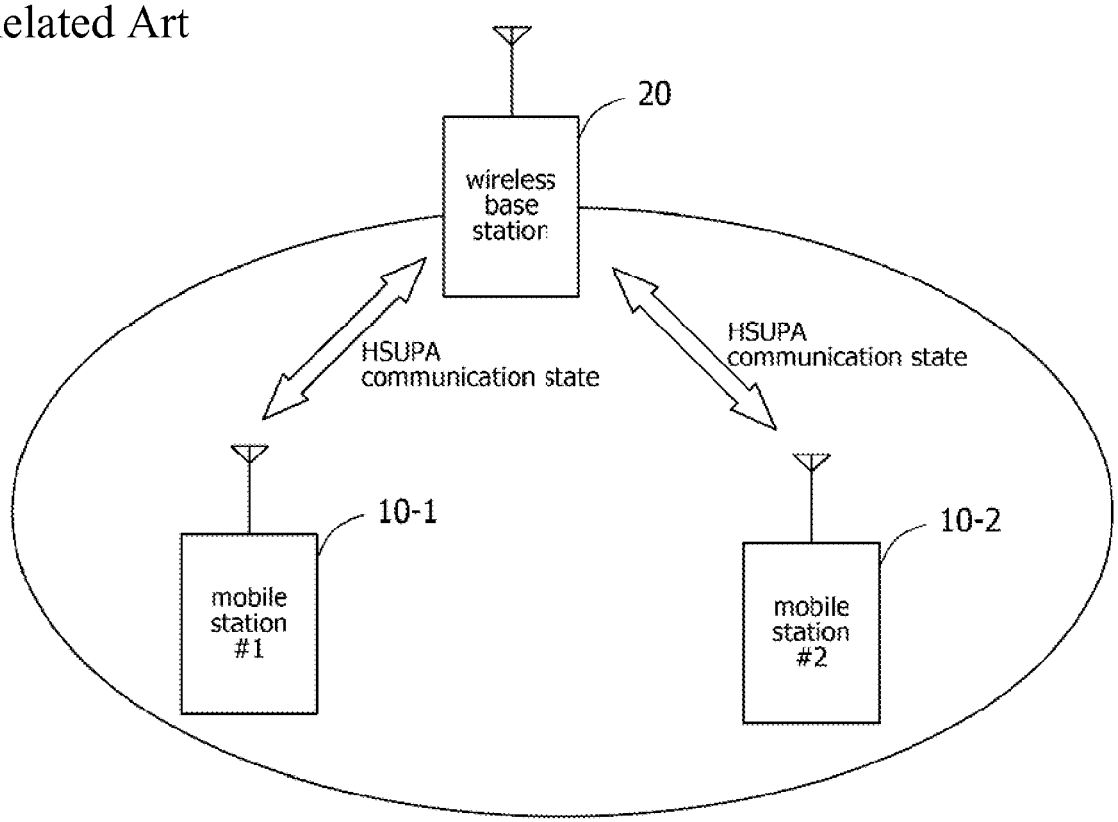
FIG. 2 is a diagram for explaining an example of an HSUPA communication state of a mobile communication system.
Figure 3:
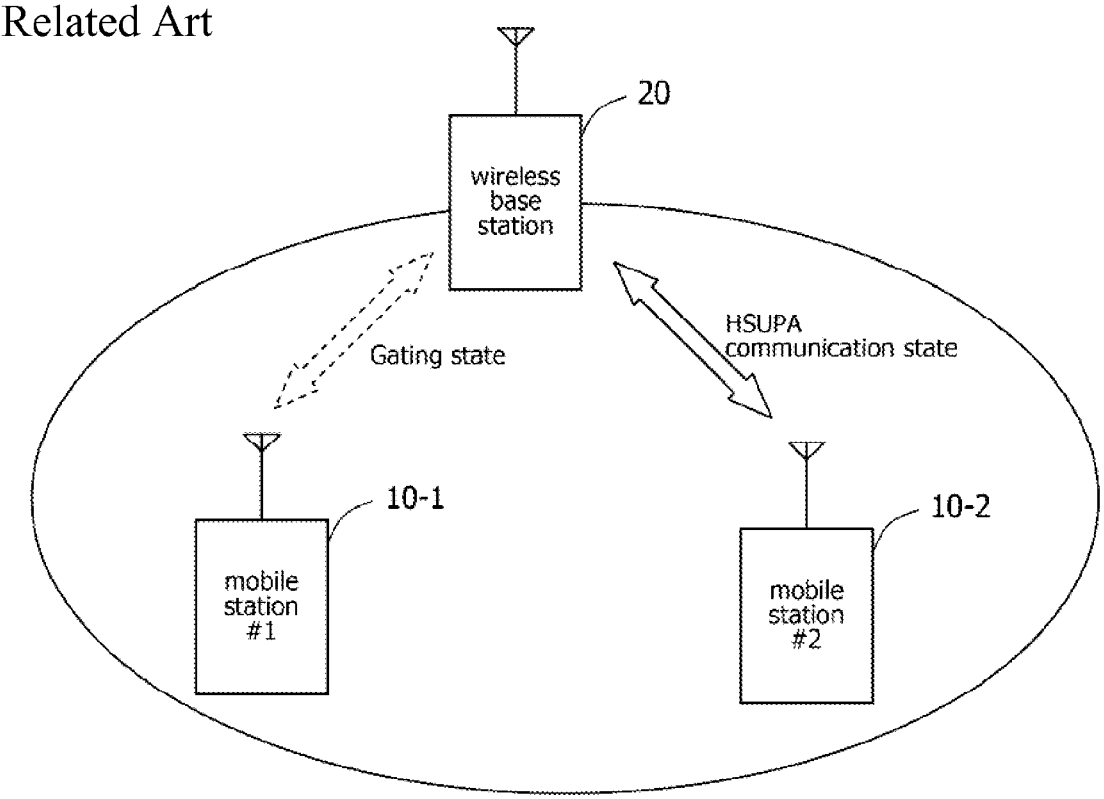
FIG. 3 is a diagram for explaining another example of the HSUPA communication state of the mobile communication system.
Figure 4:
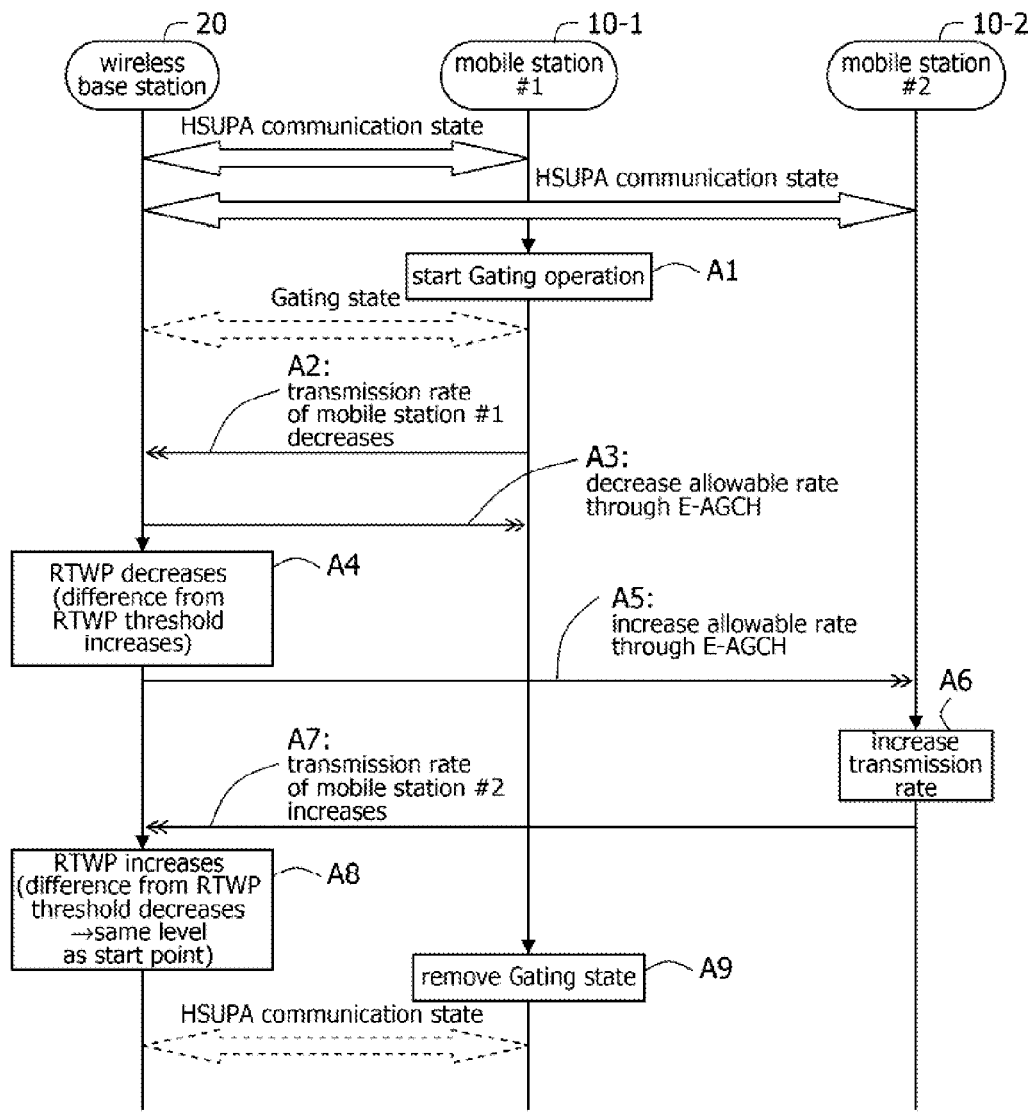
FIG. 4 is a sequence diagram for explaining an example of the operation when a mobile station removes a Gating state and restarts HSUPA communication in a conventional mobile communication system.
Figure 5A:
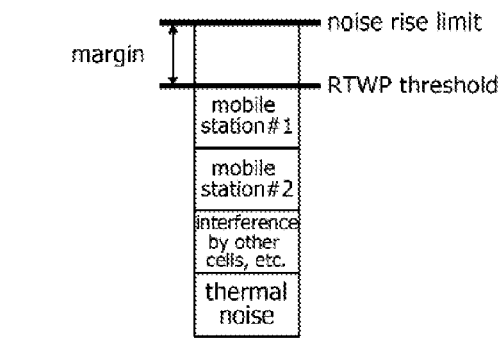
FIG. 5 is a diagram for explaining the relationship between RTWP and an RTWP threshold in a conventional wireless base station.
Figure 5B:
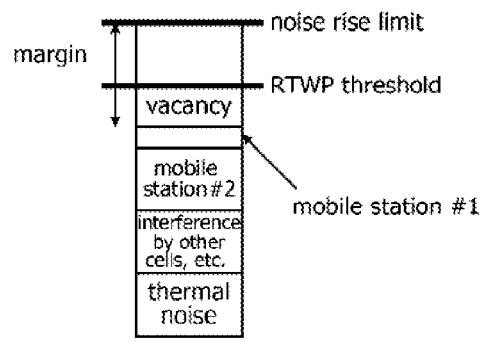
Figure 5C:
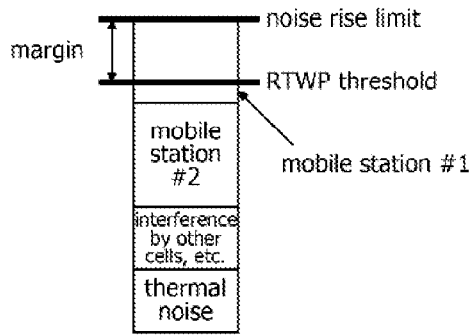

Although the system configuration of a mobile communication system of the exemplary embodiment is the same as in FIGS. 2 and 3, the configuration of a MAC-e scheduler of wireless base station 20 is different as compared to the conventional configuration.

Figure 6:
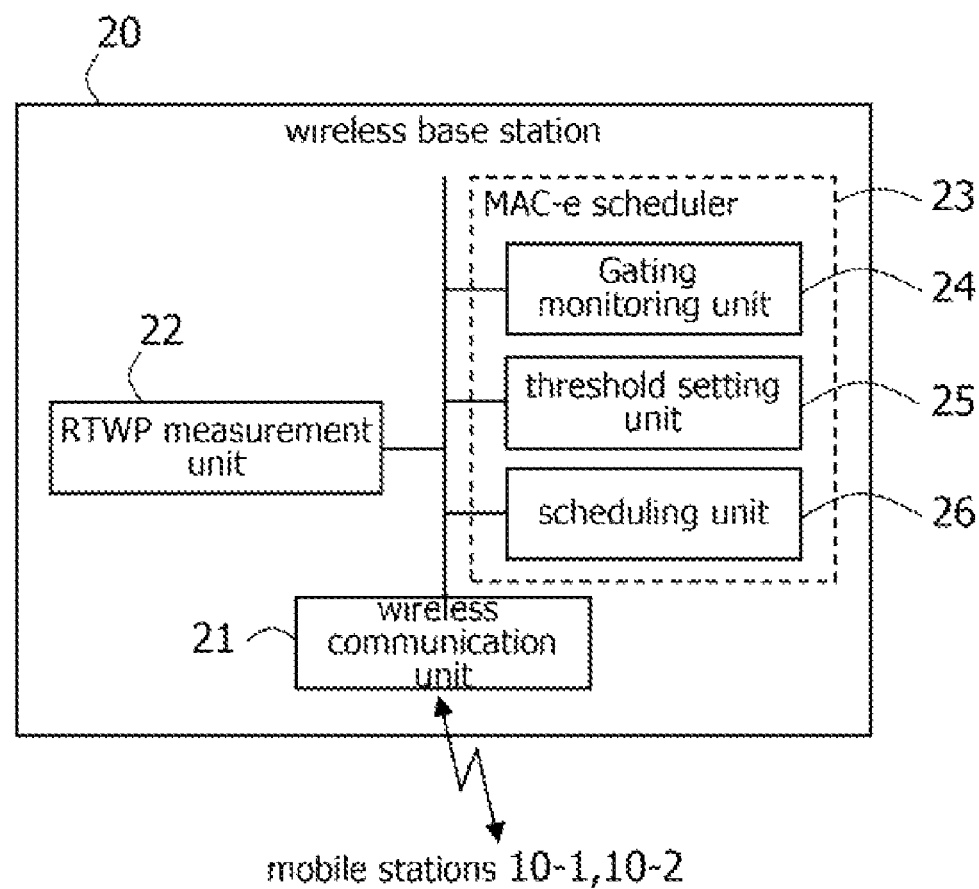
FIG. 6 is a block diagram of a configuration of a wireless base station of an exemplary embodiment.

As shown in FIG. 6, wireless base station 20 of the exemplary embodiment includes wireless communication unit 21, RTWP measurement unit 22, and MAC-e scheduler 23. Among these, wireless communication unit 21 and RTWP measurement unit 22 are the same as the conventional configurations.

Wireless communication unit 21 performs HSUPA communications between mobile station (#1) 10-1 and mobile station (#2) 10-2.

RTWP measurement unit 22 measures the RTWP of wireless base station 20 at a certain cycle.

MAC-e scheduler 23 includes Gating monitoring unit 24, threshold setting unit 25, and scheduling unit 26.

Gating monitoring unit 24 monitors the start and the removal of the Gating state by mobile station (#1) 10-1 and mobile station (#2) 10-2.

When one of mobile station (#1) 10-1 and mobile station (#2) 10-2 starts a Gating operation, the transmission rate of the mobile station decreases as the mobile station starts the Gating operation. Therefore, threshold setting unit 25 lowers the RTWP threshold by the amount of an RTWP offset during the Gating operation, which is equivalent to the difference in the decreased transmission rate.

When the mobile station removes the Gating state and restarts HSUPA communication, threshold setting unit 25 raises the RTWP threshold by the amount of the RTWP offset during the Gating operation and restores the RTWP threshold to a value in which the RTWP offset during the Gating state is not used.

Scheduling unit 26 schedules the allowable transmission rates of mobile station (#1) 10-1 and mobile station (#2) 10-2.

Specifically, if the RTWP of wireless base station 20 is less than the RTWP threshold, scheduling unit 26 allocates the transmission rate, which is equivalent to the difference between the RTWP and the RTWP threshold, to a mobile station other than the mobile station in the Gating state.

When the mobile station in the Gating state removes the Gating state and restarts HSUPA communication, scheduling unit 26 allocates, to the mobile station, the transmission rate by the amount of the RTWP offset during Gating state of the mobile station.

Figure 7:
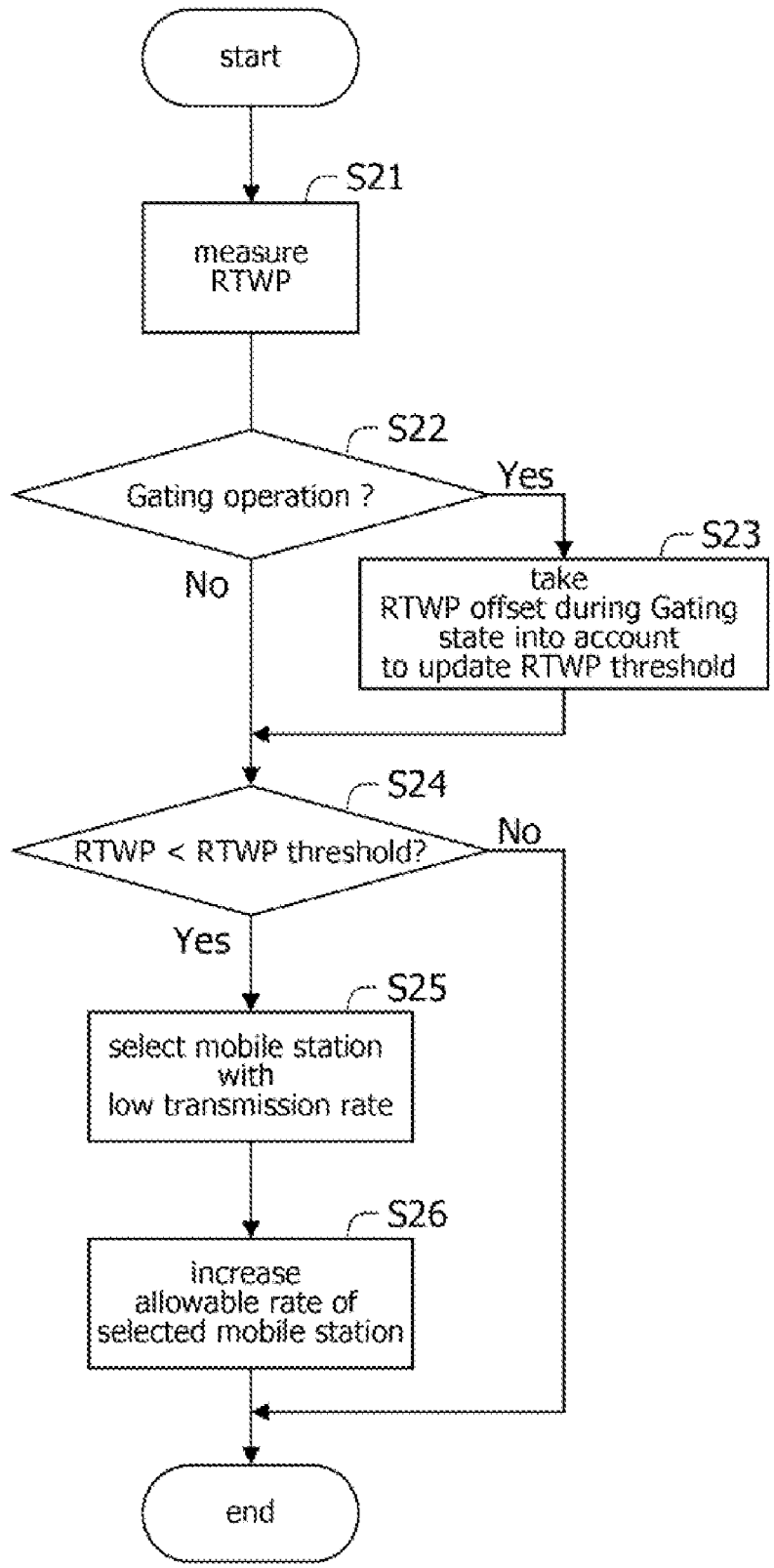
FIG. 7 is a flow chart for explaining an example of the operation of a MAC-e scheduler of the exemplary embodiment.

An example of the operation of MAC-e scheduler 23 of wireless base station 20 will be described with reference to FIG. 7.

RTWP measurement unit 22 of wireless base station 20 measures the RTWP at a certain cycle (step S21), and the measurement result is used for the scheduling in MAC-e scheduler 23.

Subsequently, although MAC-e scheduler 23 compares the RTWP measured in step S21 and the RTWP threshold in the related art, threshold setting unit 25 determines whether mobile station (#1) 10-1 and mobile station (#2) 10-2 are in the Gating state in the exemplary embodiment (step S22). If neither mobile station is in the Gating state as a result of the determination in step S22, the process moves to step S24 as in the related art, and if one of the mobile stations is in the Gating state, the process moves to step S23. It is assumed here that mobile station (#1) 10-1 is in the Gating state and that the process moves to step S23.

In step S23, threshold setting unit 25 of MAC-e scheduler 23 lowers the original RTWP threshold by the amount of the RTWP offset during the Gating state of mobile station (#1)

10-1 in the Gating operation to update the value. The operation implies that the electric power equivalent to the transmission rate allocated to mobile station (#1) 10-1 is secured in advance, and that allocation of the electric power to other mobile stations can be prevented.

Subsequently, scheduling unit 26 of MAC-e scheduler 23 compares the RTWP measured in step S21 and the RTWP threshold updated in step S23 (step S24).

If RTWP<RTWP threshold as a result of the comparison in step S24, the process moves to step S25. In this case, there is still an excess in electric power since the RTWP does not reach the RTWP threshold. Therefore, the transmission rate of one of the mobile stations can be increased. In step S25, scheduling unit 26 of MAC-e scheduler 23 selects a mobile station in which an increase in the transmission rate will be allowed. Although various algorithms can be considered, it is assumed here that the algorithm is for preferentially selecting a mobile station having a low transmission rate (reception rate in the wireless base station). Scheduling unit 26 of MAC-e scheduler 23 then increases the allowable transmission rate of the mobile station selected in step S25 (step S26). However, even if RTWP<RTWP threshold, the allowable transmission rate is not increased in step S26 if the RTWP after the increase in the allowable transmission rate exceeds the RTWP threshold. Thus, it is appropriate that MAC-e scheduler 23 increases the allowable transmission rate based on a notification through the E-AGCH only if MAC-e scheduler 23 determines that the allowable transmission rate can be increased. However, in the exemplary embodiment, the process does not move to steps S25 and S26 due to mobile station (#1) 10-1 because the fact that mobile station (#1) 10-1 is in the Gating state is taken into consideration, and the comparison is performed after updating of the value by lowering the RTWP threshold by the amount of the RTWP offset during the Gating state of mobile station (#1) 10-1.

On the other hand, if RTWP≧RTWP threshold as a result of the comparison in step S24, the process ends. In this case, transmission in high electric power mode (high rate) can no longer be allowed for the mobile station, because the RTWP is equal to or greater than the RTWP threshold.

The foregoing operation secures the electric power of mobile station (#1) 10-1 that is in the Gating state.

Figure 8:
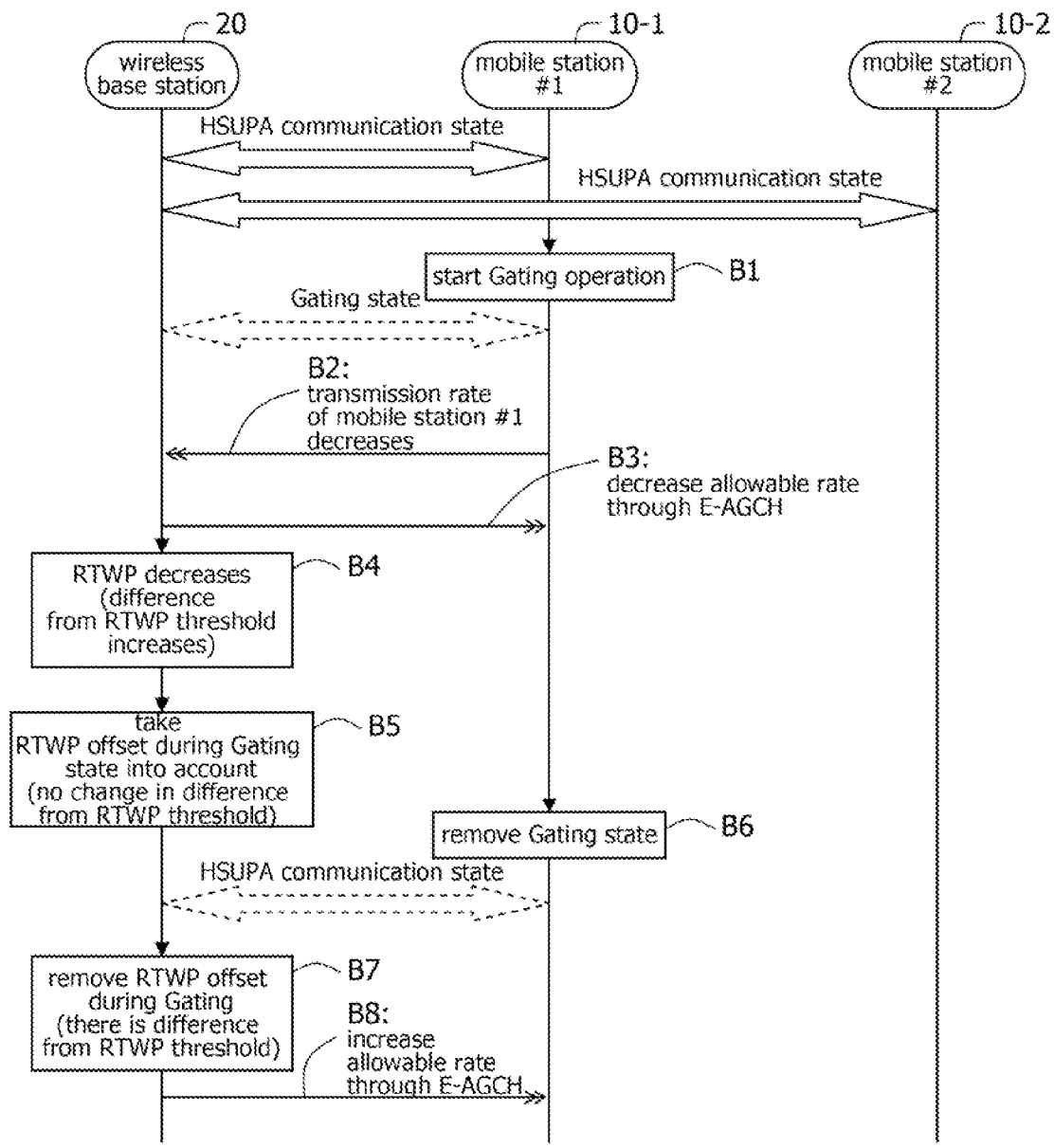
FIG. 8 is a sequence diagram for explaining an example of the operation when a mobile station removes a Gating state and restarts HSUPA communication in a mobile communication system of the exemplary embodiment.

An operation, in which the mobile station removes the Gating state and restarts HSUPA communication, in the mobile communication system of the exemplary embodiment will be described with reference to FIGS. 8 and 9. The system configuration corresponds to the configurations in FIGS. 2 and 3.

Figure 9A:
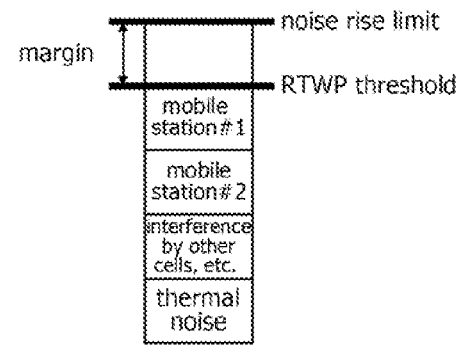
FIG. 9 is a diagram for explaining the relationship between RTWP and an RTWP threshold in the wireless base station of the exemplary embodiment.

As shown in FIG. 2, it is assumed that mobile station (#1) 10-1 and mobile station (#2) 10-2 are under the control of wireless base station 20 and are in the HSUPA communication state. The relationship between the RTWP of wireless base station 20 and the RTWP threshold at this point is as shown in FIG. 9A.

It is assumed that there is no more data for mobile station (#1) 10-1 to transmit to wireless base station 20 and that, as shown in FIG. 3, the Gating operation for terminating the transmission operation through the physical channel is started to prevent uplink interference (step B1). Consequently, since mobile station (#1) 10-1 terminates uplink data transmission, the transmission rate of mobile station (#1) 10-1 (reception rate of wireless base station 20) decreases (step B2). An average value, not an instantaneous value, is used for the transmission (reception) rate in many cases.

Since the transmission rate of mobile station (#1) 10-1 (reception rate of wireless base station 20) decreases, scheduling unit 26 of MAC-e scheduler 23 in wireless base station 20 decreases the allowable transmission rate of mobile station (#1) 10-1 by notification through the E-AGCH (step B3).

Figure 9B:
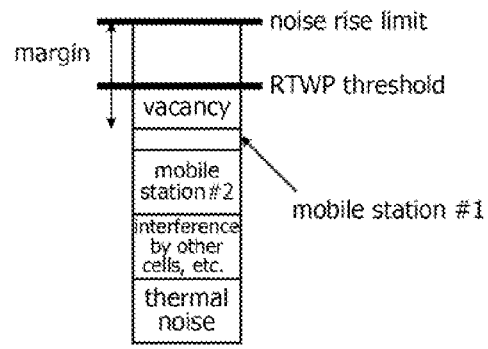

As the transmission rate of mobile station (#1) 10-1 (reception rate of wireless base station 20) decreases, the RTWP of wireless base station 20 decreases, and the difference between the RTWP and the RTWP threshold increases (step B4). The relationship between the RTWP and the RTWP threshold of wireless base station 20 in this case is as shown in FIG. 9B.

Figure 9C:
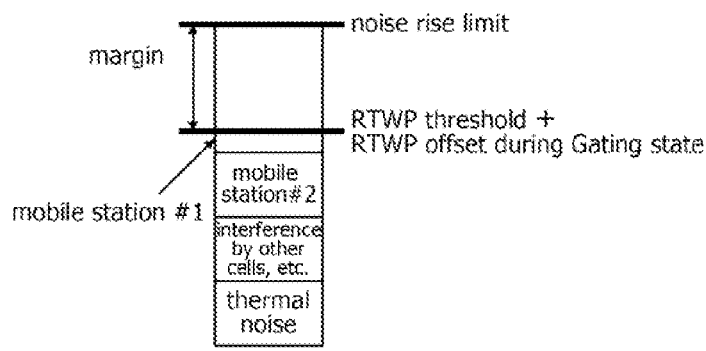

At this point, in the exemplary embodiment, threshold setting unit 25 of MAC-e scheduler 23 takes the fact that mobile station #1 is in the Gating state into consideration and updates the RTWP threshold to a value in which the RTWP offset during the Gating state is lowered (step B5). The relationship between the RTWP and the RTWP threshold of wireless base station 20 in this case is as shown in FIG. 9C.

In this way, an operation, which has been conventionally performed by MAC-e scheduler 23, of notifying, through the E-AGCH, the increase in the allowable transmission rate to the mobile station having the lowest reception (transmission) rate among the mobile stations other than mobile station (#1) 10-1 under the control [mobile station (#2) 10-2 in this case because the target mobile station is only mobile station (#2) 10-2] can be prevented. Therefore, the allowable transmission rate of mobile station (#2) 10-2 does not change.

It is assumed here that mobile station (#1) 10-1 has removed the Gating state to restart HSUPA communication (step B6).

However, the transmission rate of mobile station (#1) 10-1 at this point is still decreased because the allowable transmission rate is decreased in step B3.

However, if mobile station (#1) 10-1 removes the Gating state, threshold setting unit 25 of MAC-e scheduler 23 restores the RTWP threshold to a value in which the RTWP offset during the Gating state is not used (step B7). Therefore, scheduling unit 26 can increase the transmission rate of mobile station (#1) 10-1 by a notification through the E-AGCH (step B8).

In this way, the transmission rate before the Gating operation is started can be quickly restored when mobile station (#1) 10-1 in the Gating state removes the Gating state and restarts HSUPA communication.

As described, in the exemplary embodiment, when one of mobile station (#1) 10-1 and mobile station (#2) 10-2 starts the Gating operation, wireless base station 20 lowers the RTWP threshold by the amount of the RTWP offset during the Gating state which is the amount equivalent to the decrease in the transmission rate generated as the mobile station starts the Gating operation, or equivalent to the difference from the RTWP threshold.

Therefore, allocation of the transmission rate, which is equivalent to the difference from the RTWP threshold generated as the mobile station starts the Gating operation, to other mobile stations can be prevented. As a result, the electric power for the mobile station to remove the Gating state and restart the HSUPA communication can be secured, and the transmission rate before the Gating operation is started can be quickly restored.

Furthermore, in the exemplary embodiment, the Gating operation can be realized by a simple configuration change in wireless base station 20, in which the RTWP threshold is updated depending on whether the mobile station is in the Gating state.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A mobile communication system comprising: a base station; and a plurality of mobile stations that are under control of the base station and that start a Gating operation for terminating a transmission operation through a physical channel if no more data is to be transmitted to the base station during High Speed Uplink Packet Access (HSUPA) communication with the base station through the physical channel, the base station allocating a transmission rate to each of the plurality of mobile stations, the base station comprising:
a Received Total Wide Band Power (RTWP) measurement unit that measures RTWP of the base station;
a monitoring circuit that monitors a start and a removal of a Gating state by each of the plurality of mobile stations;
a threshold setting circuit that, when a mobile station of the plurality of mobile stations starts the Gating operation and thereby enters the Gating state, lowers a threshold by an amount of an offset, which is equivalent to a difference between a transmission rate of the mobile station during the HSUPA communication and a transmission rate of the mobile station during the Gating operation; and
a scheduling circuit that allocates a transmission rate, which is equivalent to a difference between the RTWP of the base station and the threshold, to a mobile station other than the mobile station in the Gating state among the plurality of mobile stations if the RTWP of the base station is less than the threshold.

2. The mobile communication system according to claim 1, wherein
the scheduling circuit allocates a transmission rate by the amount of the offset of the mobile station to the mobile station if the mobile station in the Gating state removes the Gating state.

3. The mobile communication system according to claim 2, wherein
the threshold setting circuit raises the threshold by the amount of the offset of the mobile station if the mobile station in the Gating state removes the Gating state.

4. A base station that allocates a transmission rate to each of a plurality of mobile stations that are under control of the base station and that start a Gating operation for terminating a transmission operation through a physical channel if no more data is to be transmitted during High Speed Uplink Packet Access (HSUPA) communication through the physical channel, the base station comprising:
a Received Total Wide Band Power (RTWP) measurement unit that measures RTWP of the base station;
a monitoring circuit that monitors a start and a removal of a Gating state by each of the plurality of mobile stations;
a threshold setting circuit that, when a mobile station of the plurality of mobile stations starts the Gating operation and thereby enters the Gating state, lowers the threshold by an amount of an offset, which is equivalent to a difference between a transmission rate of the mobile station during the HSUPA communication and a transmission rate of the mobile station during the Gating operation; and
a scheduling circuit that allocates a transmission rate, which is equivalent to a difference between the RTWP of the base station and the threshold, to a mobile station other than the mobile station in the Gating state among the plurality of mobile stations if the RTWP of the base station is less than the threshold.

5. The base station according to claim 4, wherein
the scheduling circuit allocates a transmission rate by the amount of the offset of the mobile station to the mobile station if the mobile station in the Gating state removes the Gating state.

6. The base station according to claim 5, wherein
the threshold setting circuit raises the threshold by the amount of the offset of the mobile station if the mobile station in the Gating state removes the Gating state.

7. A transmission rate allocation method for a base station to allocate a transmission rate to each of a plurality of mobile stations that are under control of the base station and that start a Gating operation for terminating a transmission operation through a physical channel if no more data is to be transmitted during High Speed Uplink Packet Access (HSUPA) communication through the physical channel, the transmission rate allocation method comprising:
measuring a Received Total Wide Band Power (RTWP) of the base station;
monitoring a start and a removal of a Gating state by each of the plurality of mobile stations;
when a mobile station of the plurality of mobile stations starts the Gating operation and thereby enters the Gating state, setting a threshold to lower the threshold by an amount of an offset, which is equivalent to a difference between a transmission rate of the mobile station during the HSUPA communication and a transmission rate of the mobile station during the Gating operation; and
scheduling to allocate a transmission rate, which is equivalent to a difference between the RTWP of the base station and the threshold, to a mobile station other than the mobile station in the Gating state among the plurality of mobile stations if the RTWP of the base station is less than the threshold.

8. The transmission rate allocation method according to claim 7, wherein
in the scheduling, a transmission rate for the amount of the offset of the mobile station is allocated to the mobile station if the mobile station in the Gating state removes the Gating state.

9. The transmission rate allocation method according to claim 8, wherein
in setting the threshold, the threshold is raised by the amount of the offset of the mobile station if the mobile station in the Gating state removes the Gating state.

* * * * *